G. L. HIERONYMUS.
NUT LOCK.
APPLICATION FILED JULY 26, 1915.

1,155,356.

Patented Oct. 5, 1915.

Inventor
G. L. Hieronymus
By Watson E. Coleman
Attorney

UNITED STATES PATENT OFFICE.

GEORGE L. HIERONYMUS, OF WINCHESTER, ILLINOIS.

NUT-LOCK.

1,155,356. Specification of Letters Patent. Patented Oct. 5, 1915.

Application filed July 26, 1915. Serial No. 42,005.

*To all whom it may concern:*

Be it known that I, GEORGE L. HIERONYMUS, a citizen of the United States, residing at Winchester, in the county of Scott and State of Illinois, have invented certain new and useful Improvements in Nut-Locks, of which the following is a specification, reference being had to the accompanying drawings.

This invention relates to nut locks and has for its primary object to provide a simple, reliable and effective device of this character which will securely lock the bolt and nut in place without requiring any special form or construction of either the bolt or the nut.

The invention has for another object to provide an effective nut lock which may be repeatedly used without, in any way, deleteriously affecting its efficiency.

It is an additional object of the invention to provide a device of this character embodying a collar for engagement against the face of the object through which the bolt extends, and a split washer permanently fixed at one end to one side of the collar and having a key coöperating with the wall of a recess formed in the collar whereby the key is forced into biting engagement with the threads on the bolt when the nut is moved up upon the bolt into tight engagement against the washer plate, said washer plate being adapted to be bent downwardly upon one or more of the side faces of the nut.

The invention has for a further general object to provide a nut lock, the several parts of which are exceedingly simple in form and can be inexpensively manufactured, the locking elements being permanently carried by the washer plate so that they are not likely to be easily lost, so that the device may be conveniently employed in automobile construction and machines of various kinds.

Figure 1:
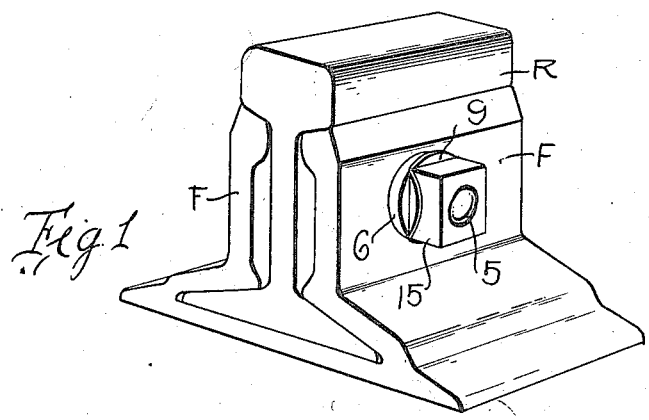
Figure 2:
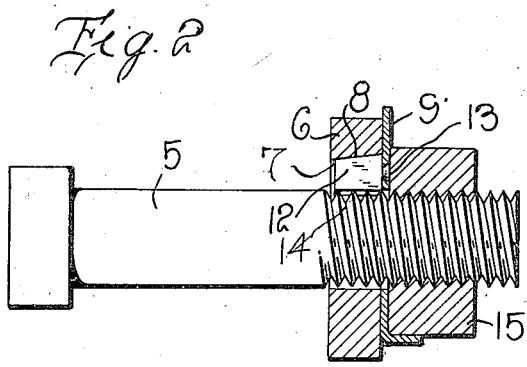
Figure 3:
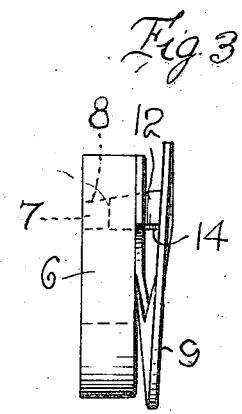
Figure 4:
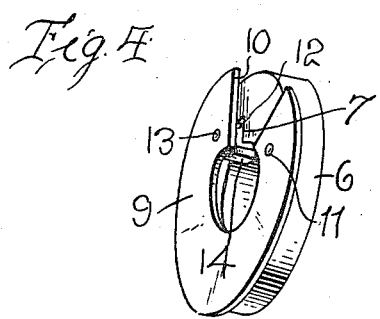
Figure 5:
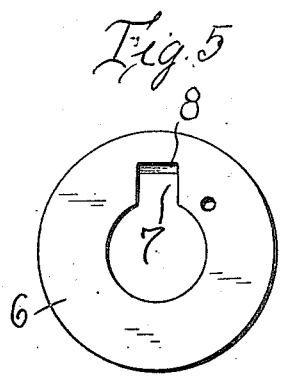

With the above and other objects in view, my invention consists in the novel features of construction, combination and arrangement of parts to be hereinafter more fully described, claimed and illustrated in the accompanying drawing, in which, Figure 1 is a perspective view showing my improved nut lock as applied to a fastening bolt for the fish plates of a railway rail; Fig. 2 is an enlarged vertical section through the nut lock; Fig. 3 is a side elevation of the collar with the washer plate disposed in its normal position; Fig. 4 is a perspective view of the collar and washer plate removed from the bolt; and Fig. 5 is a detail face view of the collar.

Referring in detail to the drawing, 5 designates the bolt which may be of any required diameter and provided with threads of any desired pitch. I have shown my invention as applied to a bolt such as is commonly employed for fastening fish plates, indicated at F, on opposite sides of the web of a rail R.

It is one of the principal objects of my invention to provide a simple and effective lock for the bolts of rails, which does not require any changes in the construction of the ordinary bolt and nut, and to this end I employ a collar, shown at 6, which is preferably sufficiently thick to extend over or cover at least four of the threads on the bolt. This collar is formed with a rectangular recess 7 communicating with the bolt receiving bore thereof, and the outer end wall of the recess is obliquely inclined from one face to the other of the collar, as at 8.

A sheet iron washer plate is permanently attached to and carried by the collar 6. This washer plate 9, which is of greater diameter than the diameter of the washer, is split, as indicated at 10, and one extremity of the washer is permanently fixed to the collar by means of a rivet or other suitable securing means 11 extending transversely through the collar. Adjacent to the other end of the split washer, a key 12 is fixed thereto by means of the rivet, indicated at 13. It will be observed, from reference to Fig. 4, that this free end of the split washer is normally spaced from the face of the collar 6. The key 12 extends at right angles to the collar and inwardly into the recess 7 in the collar. It will be observed that the key 12 tapers longitudinally and, upon its bottom face, is beveled in opposite directions to produce the central point or ridge 14. The rivet 11, which is permanently fastened to one end of the split washer of the collar, is located nearer to the bore of the collar than to its outer edge, so that said rivet will be covered by the nut when it is threaded up on the bolt against the face of the washer plate.

The nut, indicated at 15, may be of any desired polygonal form and is of the ordinary construction. This nut coöperates with the free movable end of the washer plate 9 to securely lock all of the parts together, as will now be described.

After the bolt 5 has been inserted through the coinciding openings in the fish plates and the rail web, the collar 6 is inserted upon the end of the bolt against the face of the fish plate. The nut 15 is then threaded inwardly upon the end of the bolt against the free end of the washer plate 9. The pressure of the nut upon the washer plate forces the key 12 into the recess 7 in the collar, and the outer face of this key wedging against the inclined wall 8 of said recess, causes the key to be forced inwardly so that its point or edge 14 will bite into the threads of the bolt 5. Thus, the collar and washer plate are held against turning movement on the bolt or vice versa. As above noted, the nut 15 will be disposed over the outer end of the rivet 11 and the outer edge portion of the sheet metal washer may now be bent down upon either one of the side faces of the nut or all of the several faces thereof. For all practical purposes, however, it is sufficient to bend a portion of the edge of the washer plate against one of the nut faces whereby the nut is held against turning movement upon the bolt.

From the foregoing description, taken in connection with the accompanying drawing, the construction, manner of operation and several advantages of my invention will be clearly and fully understood. When it is desired to remove the nut from the bolt, a chisel or other implement may be inserted between the bent edge of the washer plate and the face of the nut and said bent portion of the plate scraped so as to permit the nut to be turned. By means of a suitable wrench, the nut can now be unthreaded from the bolt and the point of the chisel is then inserted between the washer plates 9 and the face of the collar 6 and outward pressure exerted against the plate so as to loosen the key 12 from engagement with the bolt. The collar and washer plate can then be slipped off of the bolt and the bolt removed from the object. Thus, my improved nut lock may be repeatedly used without any material decrease in its efficiency.

As the washer plate carrying the locking key is permanently fixed to the collar, the parts are not likely to be easily lost and may be very easily and quickly arranged upon the bolt and adjusted to locking position.

I have above referred to the use of my improved nut lock upon the bolt fastenings for railway fish plates, but it is, of course, apparent that the invention may also be advantageously employed in many other instances where it is desirable to provide a secure and effective lock for the bolt and nut. I also reserve the privilege of adopting all such legitimate modifications as may be fairly embodied within the spirit and scope of the invention as claimed.

Having thus fully described my invention, what I desire to claim and secure by Letters Patent is:

1. The combination with the bolt and nut, of a collar adapted to be engaged upon the bolt against the face of the object, a sheet metal washer plate permanently fixed upon one face of the collar and having a relatively movable section, said collar being provided with a recess communicating with the bore thereof, said recess having an inclined wall, and a key lug fixed to the movable section of the washer plate and extending into said recess, said movable section of the plate being forced into engagement against the face of the collar when the nut is threaded up upon the bolt and said key lug forced inwardly by engagement with the inclined wall of the recess into biting engagement with the bolt threads.

2. The combination with a bolt and nut, of a collar adapted to be engaged upon the bolt against the face of the object and having a recess communicating with the bore thereof, the base wall of the recess being obliquely inclined, a split washer plate permanently fixed at one of its ends to the face of the collar, the other end portion of the split washer being normally spaced from the face of the collar, and a key lug fixed to the latter end of the washer plate and movable in the recess of the collar, said washer plate being of greater diameter than the collar and the movable portion of said plate being forced into engagement against the face of the collar when the nut is threaded up upon the bolt whereby the key lug, engaging the inclined wall of the recess in the collar, is forced into biting engagement with the bolt threads, the outer edge of the plate being adapted to be bent over against the face of the nut to prevent turning movement of the same upon the bolt.

In testimony whereof I hereunto affix my signature in the presence of two witnesses.

GEORGE L. HIERONYMUS.

Witnesses:
J. WALTON DACE,
J. M. RIGGS.

Copies of this patent may be obtained for five cents each, by addressing the "Commissioner of Patents, Washington, D. C."